United States Patent [19]

Witzel et al.

[11] 3,853,897

[45] Dec. 10, 1974

[54] CERTAIN 1-SUBSTITUTED-3-AMINO-1(2H)PYRIDONES

[75] Inventors: Bruce E. Witzel; Tsung-Ying Shen, both of Westfield; Patricia M. Graham, Mountainside; Robert L. Clark, Woodbridge; Arsenio A. Pessolano, Colonia, all of N.J.

[73] Assignee: Merck & Co., Inc., Rahway, N.J.

[22] Filed: Jan. 4, 1973

[21] Appl. No.: 321,070

Related U.S. Application Data

[60] Continuation-in-part of Ser. No. 163,495, July 16, 1971, abandoned, which is a division of Ser. No. 876,059, Nov. 12, 1969, Pat. No. 3,654,291.

[52] U.S. Cl....260/296 R, 260/294.8 D, 260/294.8 F, 260/294.8 G, 260/294.8 T, 260/294.9, 260/295 R, 260/295 AM, 260/297 Z, 424/263, 424/266
[51] Int. Cl............................................C07d 31/42
[58] Field of Search ................................ 260/296 R
[56] References Cited
UNITED STATES PATENTS

| | | | |
|---|---|---|---|
| 3,655,897 | 4/1972 | Witzel | 260/294.8 T |
| 3,721,676 | 3/1973 | Witzel et al. | 260/296 R |
| 3,776,918 | 12/1973 | Hegar et al. | 260/296 R |

*Primary Examiner*—Alan L. Rotman
*Attorney, Agent, or Firm*—Rudolph J. Anderson, Jr.; Harry E. Westlake, Jr.; Mario A. Monaco

[57] ABSTRACT

Novel primary aminopyridones useful as antiinflammatory, analgesic and antipyretic agents.

2 Claims, No Drawings

CERTAIN 1-SUBSTITUTED-3-AMINO-1(2H)PYRIDONES

CROSS REFERENCE TO RELATED APPLICATIONS

This application is a continuation-in-part of U.S. application Ser. No. 163,495, filed July 16, 1971 now abandoned which is a division of U.S. application Ser. No. 876,059, filed Nov. 12, 1969 now U.S. Pat. No. 3,654,291.

This invention relates to a novel class of compounds. In addition it relates to a class of compounds useful in the treatment of inflammation which also exhibit potent analgesic and antipyretic acitivity. More particularly the invention is concerned with amino-substituted pyridones, pyridinethiones, hydroxypyridines and mercaptopyridines.

The novel pyridones and pyridines of the invention have the following structural formulas:

FORMULA I

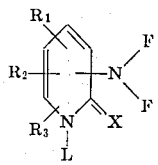

and

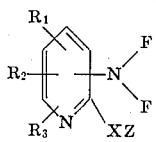

in which L may be hydrogen; alkyl (preferably lower alkyl such as methyl, ethyl, propyl, etc.); alkenyl (preferably lower alkenyl such as vinyl, allyl, methallyl, etc.); alkynyl (preferably lower alkynyl such as ethynyl, methylbutynyl, propynyl, etc.); aralkyl (preferably arloweralkyl such as benzyl and substituted benzyl, phenethyl, phenylhexyl, etc.); aryl (preferably phenyl) or substituted phenyl (such as tolyl, halophenyl, hydroxyphenyl, anisyl, etc.); hydroxyalkyl (preferably hydroxyloweralkyl such as hydroxyethyl, hydroxypropyl, etc.; amino; dialkylamino perferably diloweralkylamino); dialkylaminoalkyl (preferably diloweralkylaminoloweralkyl such as diethylaminoethyl, etc.); carboxyalkyl (preferably carboxyloweralkyl such as carboxymethyl, carboxyethyl, carboxypropyl, etc..); alkylaminoalkyl (preferably loweralkylaminoloweralkyl haloalkyl (preferably haloloweralkyl such as trifluoromethyl, etc.); alkylamino such as methylamino; ethylamino etc.; alkylamidoalkyl (preferably loweralkylamidoloweralkyl such as acetamidoethyl, etc.); hydroxy; N-alkanoylalkylaminoalkyl such as N-acetyl-methylaminoethyl; N-alkyl-N-alkyl'aminoalkyl such as N-ethyl-N-methylaminopropyl; aralkenyl (preferably araloweraralkenyl such as styryl, phenylpropylenyl, phenylbutylenyl; etc.); alkoxy; heterocyclic such as furyl, tetrahydropyranyl, thienyl, pyridyl, thiazolyl, imidazolyl, thiadiazolyl, oxazolyl and substituted derivatives thereof, etc.;

F may be each hydrogen or acyl such as formyl, acetyl, propionyl, butyryl, benzoyl etc.; alkoxycarbonyl such as methoxycarbonyl, etc.;

X may be O or S;

Z may be H, alkyl or aryl such as phenyl etc.;

$R_1$ $R_2$ and $R_3$ may each be haloalkyl (preferably haloloweralkyl such as trichloromethyl, trifluoromethyl, etc.); alkylthio (preferably loweralkylthio such as methylthio, ethylthio, butylthio, pentylthio, etc.); alkylsulfinyl (preferably loweralkylsulfinyl such as methylsulfinyl, ethylsulfinyl, propylsulfinyl, pentylsulfinyl, etc.); alkylsulfonyl (preferably loweralkylsulfonyl such as methylsulfonyl, ethylsulfonyl, butylsulfonyl, etc.); hydroxy, sulfonamido; sulfo; carboxyalkyl (preferably carboxyloweralkyl such as carboxymethyl, carboxyethyl, carboxybutyl, etc.); alkoxy (preferably lower alkoxy such as methoxy, ethoxy, butoxy, etc..); loweralkenyloxy, such as, allyloxy; carboalkoxy (preferably carboloweralkoxy as exemplified by carbomethoxy, carbopropoxy, carbobutoxy, etc.); alkoxyalkyl (preferably loweralkoxyloweralkyl as illustrated by methoxymethyl, methoxyethyl, ethoxymethyl, etc.); arylthio such as phenylthio; aralkythio such as benzylthio; acylamino (preferably loweracylamino such as formylamino, acetylamino, etc.); hydroxyalkyl (preferably hydroxyloweralkyl such as hydroxymethyl, hydroxyethyl, hydroxypropyl, hydroxybutyl, etc..); acyl (preferably lower acyl such as formyl, acetyl, propionyl, butyryl, etc. and including benzoyl with the proviso that if a single R is acyl, the two remaining R's must be other than alkyl; alkenyl (preferably lower alkenyl such as vinyl, allyl, methallyl, etc..); alkynyl (preferably lower alkynyl such as ethynyl; propynyl, methylbutynyl, etc.); alkyl (preferably loweralkyl such as methyl, ethyl, propyl, butyl, etc.); nitro; cycloalkyl such as cyclopropyl, cyclobutyl etc.; carbamoyl and substituted carbamoyl such as N-mono and dialkyl and aryl substituted carbamoyl; with the proviso that if a single R is alkyl or nitro, the two remaining R's must be other than hydrogen; and hydrogen with the proviso that at least one R must be other than hydrogen.

The compounds of the invention which are useful in the treatment of inflammation and associated pain and fever have the following structural formulas:

FORMULA II

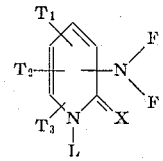

and

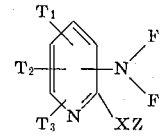

in which L may be hydrogen; alkyl (preferably loweralkyl such as methyl, ethyl, propyl, etc.); alkenyl (preferably lower alkenyl such as vinyl, allyl, methallyl, etc.); alkynyl (preferably lower alkynyl such as ethynyl, methylbutynyl, propynyl, etc.); aralkyl (preferably arloweralkyl such as benzyl and substituted benzyl, phenethyl, phenylhexyl, etc.); aryl (preferably phenyl) or substituted phenyl (such as tolyl, halophenyl, anisyl, hydroxyphenyl etc.); hydroxyalkyl (preferably hydroxyloweralkyl such as hydroxymethyl, hydroxyethyl, hydroxypropyl, etc.); alklaminoalkyl such as methylaminomethyl etc.; carboxyalkyl (preferably carboxy loweralkyl such as carboxymethyl, carboxyethyl, carboxypropyl, etc.); amino; dialkylamino such as dimethylamino etc.; haloalkyl (preferably haloloweralkyl such as trifluoromethyl, etc.); alkylamino such as methylamino, ethylamino etc.; dialkylaminoalkyl – as represented by dimethylaminoethyl, diethylaminoethyl, etc.; hydroxy; alkoxy; alkylamidoalkyl (preferably loweralkylamidoloweralkyl such as acetamidoethyl, etc.); N-alkanoyl-alkylaminoalkyl such as N-acetylmethylaminoethyl; N-alkyl-N-alkyl'aminoalkyl such as N-ethyl-N-methylaminopropyl; aralkenyl (preferably arloweralkenyl such as styryl, phenylpropylenyl, phenylbutylenyl, etc.); heterocylic such as furfuryl, tetrahydropyranyl, thienyl, pyridyl and substituted derivatives thereof; F may be each hydrogen or acyl such as formyl, acetyl propionyl, butyryl, benzoyl etc.;

X may be O or S;

Z may be H, alkyl or aryl such as phenyl;

$T_1$, $T_2$ and $T_3$ may each be haloalkyl (preferably haloloweralkyl such as trichloromethyl, trifluoromethyl, etc.); alkylthio (preferably loweralkylthio such as methylthio, ethylthio, butylthio, pentylthio, etc.); alkylsulfinyl (preferably loweralkylsulfinyl such as methylsulfinyl, ethylsulfinyl, propylsulfinyl, pentylsulfinyl, etc.); alkylsulfonyl (preferably loweralkylsulfonyl such as methylsulfonyl, ethylsulfonyl, butylsulfonyl, etc.); hydroxy; sulfonamido; sulfo; carboxyalkyl (preferably carboxyloweralkyl such as carboxymethyl, carboxyethyl, carboxybutyl, etc.); alkoxy (preferably lower alkoxy such as methoxy, ethoxy, butoxy, etc.); carboalkoxy (preferably carboloweralkoxy as exemplified by carbomethoxy, carbopropoxy, carbobutoxy, etc.); alkoxyalkyl (preferably loweralkoxyloweralkyl as illustrated by methoxymethyl, methoxyethyl, ethoxypropyl, etc.); arylthio such as phenylthio; aralkylthio such as benzylthio; acylamino (preferably loweracylamino such as formylamino, acetylamino, etc.); hydroxyalkyl (preferably hydroxyloweralkyl such as hydroxymethyl, hydroxyethyl, hydroxypropyl, hydroxybutyl, etc.); acyl (preferably loweracyl such as formyl, acetyl, propionyl, butyryl, etc.); and including benzoyl; alkenyl (preferably lower alkenyl such as vinyl, allyl, methallyl, etc.); alkynyl (preferably lower alkynyl such as ethynyl, methylbutynyl, propynyl, etc.); halogen (fluoro, bromo, iodo, chloro); alkyl (preferably loweralkyl such as methyl, ethyl, propyl, butyl, etc.); nitro; hydrogen; amino; cyano; cycloalkyl (preferably cycloloweralkyl such as cyclopropyl and cyclobutyl, etc.); carbamoyl and substituted carbamoyl such as N-mono and dialkyl and aryl substituted carbamyl.

In its preferred aspects this invention relates to the class of chemical compounds of Formulas I and II wherein L is hydrogen, alkyl or aryl; F is hydrogen or acyl, X is O; and $R_1(T_1)$, $R_2(T_2)$ and $R_3(T_3)$ is alkyl, halogen, trihaloalkyl, alkylsulfinyl, alkylsulfonyl or alkylthio.

Representative of the preferred compounds of the invention as designated by Formulas I and II include the following:

a. 3-amino-4-methyl-2[1H]-pyridone
b. 5-amino-4-methyl-2[1H]-pyridone
c. 3-amino-5-methyl-2[1H]-pyridone
d. 3-amino-5-chloro-2[1H]-pyridone
e. 3-amino-4-t-butyl-2[1H]-pyridone
f. 3-amino-4-methyl-6-t-butyl-2[1H]-pyridone
g. 3-amino-5,6-dimethyl-2[1H]-pyridone
h. 3-amino-4,5-dimethyl-2[1H]-pyridone
i. 5-amino-4-ethyl-2[1H]-pyridone
j. 3-amino-6-ethyl-5-methyl-2[1H]-pyridone
k. 3-amino-6-sec-butyl-2[1H]-pyridone
l. 5-amino-6-ethyl-2[1H]-pyridone
m. 5-amino-6-methyl-2[1H]-pyridone
n. 3-amino-5-t-butyl-2[1H]-pyridone
o. 5-amino-4-t-butyl-2[1H]-pyridone
p. 3-amino-5-n-propyl-2[1H]-pyridone
q. 6-amino-4-methyl-2[1H]-pyridone
r. 4-amino-5-ethyl-2[1H]-pyridone
s. 3(N,N-bis-acetylamino)-4-methyl-2[1H]-pyridone
t. 3-amino-4,5,6-trimethyl-2[1H]-pyridone
u. 3-amino-4,6-dimethyl-2[1H]-pyridone Other illustrative compounds within the scope of the invention include:

3-amino-5-trifluoromethyl-2[1H]-pyridone
3-amino-5-methylsulfonyl-2[1H]-pyridone
5-amino-3-methylthio-2[1H]-pyridone
3-amino-4-ethyl-5-methylsulfinyl-2[1H]-pyridone
5-methylthio-4-ethyl-3-amino-2[1H]-pyridone
4-t-butyl-5-cyano-3-amino-2[1H]-pyridone
5-bromo-4-ethyl-3-amino-2[1H]-pyridone
5-chloro-3-amino-6-methyl-2[1H]-pyridone
6-methyl-5-amino-3-trifluoromethyl-2[1H]-pyridone
3-acetyl-5-amino-6-methyl-2-[1H]-pyridone
5-amino-3-β-hydroxyethyl-6-methyl-2[1H]-pyridone
3-acetamido-4-methyl-2[1H]-pyridone
5-methylsulfinyl-4-ethyl-3-amino-2[1H]-pyridone
5-methoxy-1,6-diemthyl-3-amino-2[1H]-pyridone
5-carbamyl-4-methyl-3-amino-2[1H]-pyridone
4-carboxymethyl-3-amino-2[1H]-pyridone
4-t-butyl-1-methyl-3-amino-2[1H]-pyridone
4-t-butyl-3-amino-1-phenyl-2[1H]-pyridone
5-ethyl-3-amino-1-tetrahydropyranyl-2[1H]-pyridone
3-amino-6-methyl-2[1H]-pyridone-5-sulfonic acid
5-ethyl-3-amino-2-pyridinethione
6-benzylthio-3-amino-2[1H]-pyridone
3-amino-5-ethyl-2-methoxypyridine
3-fluoro-4-methyl-5-amino-2[1H]-pyridone.

Further representative compounds include the following:

1,3-diamino-4-methyl-2[1H]-pyridone
1,5-diamino-4-methyl-2[1H]-pyridone
1,3-diamino-5-methyl-2[1H]-pyridone
1,3-diamino-5-chloro-2[1H]-pyridone
1,3-diamino-4-t-butyl-2[1H]-pyridone
1,3-diamino-4-cyclopropyl-6-t-butyl-2[1H]-pyridone
1,3-diamino-5,6-dimethyl-2[1H]-pyridone
1,3-diamino-4,5-dimethyl-2[1H]-pyridone
1,5-diamino-4-ethyl-2[1H]-pyridone
1,3-diamino-6-ethyl-5-methyl-2[1H]-pyridone
1,3-diamino-6-sec-butyl-2[1H]-pyridone
1,5-diamino-6-cyclobutyl-2[1H]-pyridone
1,5-diamino-6-methyl-2[1H]-pyridone
1,3-diamino-5-t-butyl-2[1H]-pyridone
1,5-diamino-4-t-butyl-2[1H]-pyridone
1,3-diamino-5-cyclopentyl-2[1H]-pyridone
1,3-diamino-4,5,6-trimethyl-2[1H]-pyridone
1,3-diamino-4,6-dimethyl-2[1H]-pyridone
1,3-diamino-5-trifluoromethyl-2[1H]-pyridone
1,3-diamino-5-methylsulfonyl-2[1H]-pyridone
1,5-diamino-3-methylthio-2[1H]-pyridone
1,3-diamino-4-ethyl-5-methylsulfinyl-2[1H]-pyridone
5-methylthio-4-ethyl-1,3-diamino-2[1H]-pyridone
4-t-butyl-5-cyano-1,3-diamino-2[1H]-pyridone
5-bromo-4-ethyl-1,3-diamino-2[1H]-pyridone
5-chloro-1,3-diamino-6-methyl-2[1H]-pyridone
6-methyl-1,5-diamino-3-trifluoromethyl-2[1H]-pyridone 3-acetyl-1,5-diamino-6-methyl-2[1H]-pyridone
1,5-diamino-3-β-hydroxyethyl-6-methyl-2[1H]-pyridone
5-methylsulfinyl-4-ethyl-1,3-diamino-2[1H]-pyridone
5-carbamyl-4-methyl-1,3-diamino-2[1H]-pyridone
4-carboxymethyl-1,3-diamino-2[1H]-pyridone
1,3-diamino-6-methyl-2[1H]-pyridone-5-sulfonic acid
5-ethyl-1,3-diamino-2-pyridinethione
6-benzylthio-1,3-diamino-2[1H]-pyridone.

Also included within the scope of the invention are the following:

3-amino-1-[2-(dimethylamino)ethyl]-4-methyl-2[1H]-pyridone
5-amino-1-dimethylaminomethyl-4-methyl-2[1H]-pyridone
3-amino-1-[3-(ethylamino)propyl]-5-cyclopropyl-2[1H]-pyridone
3-amino-1-[2-(dimethylamino)ethyl]-5-chloro-2[1H]-pyridone
3-amino-1-methylethylaminomethyl-4-t-butyl-2[1H]-pyridone
3-amino-1-methylethylaminomethyl-4-methyl-6-t-butyl-2[1H]-pyridone
3-amino-1-methylaminomethyl-5,6-dimethyl-2[1H]-pyridone
3-amino-1-dimethylaminomethyl-4,5-dimethyl-2[1H]-pyridone
5-amino-1-methylethylaminomethyl-4-ethyl-2[1H]-pyridone
3-amino-1-[2-(dimethylamino)ethyl]-6-ethyl-5-methyl-2[1H]-pyridone
3-amino-1-[3-(ethylamino)propyl]-6-sec-butyl-2[1H]-pyridone
5-amino-1-methylaminomethyl-6-ethyl-2[1H]-pyridone
5-amino-1-dimethylaminomethyl-6-cyclopentyl-2[1H]-pyridone
3-amino-1-[2-(dimethylamino)ethyl]-5-t-butyl-2[1H]-pyridone
5-amino-1-[2-(dimethylamino)ethyl]-4-t-butyl-2[1H]-pyridone
3-amino-1-methylethylaminomethyl-5-n-propyl-2[1H]-pyridone
3-amino-1-methylethylaminomethyl-4,5,6-trimethyl-2[1H]-pyridone
3-amino-1-methylaminomethyl-4,6-dimethyl-2[1H]-pyridone
3-amino-1-[2-(dimethylamino)ethyl]-5-trifluoromethyl-2[1H]-pyridone
3-amino-1-methylethylaminomethyl-5-methylsulfonyl-2[1H]-pyridone
5-amino-1-[2-(dimethylamino)ethyl]-3-methylthio-2[1H]-pyridone
3-amino-1-methylethylaminomethyl-4-ethyl-5-methylsulfinyl-2[1H]-pyridone
5-methylthio-4-ethyl-1-dimethylaminomethyl-3-amino-2[1H]-pyridone
4-t-butyl-5-cyano-1-[2-(dimethylamino)ethyl]-3-amino-2[1H]-pyridone
5-bromo-4-ethyl-1-methylethylaminomethyl-3-amino-2[1H]-pyridone
5-chloro-1-methylaminomethyl-3-amino-1-dimethylaminomethyl-6 6-methyl-2[1H]-pyridone
6-methyl-1-methylethylaminomethyl-5-amino-3-trifluoromethyl-2[1H]-pyridone
3-acetyl-5-amino-1-[2-(dimethylamino)ethyl]-6-methyl-2[1H]-pyridone
5-amino-3-β-hydroxyethyl-1-methylethylaminomethyl-6-methyl-2[1H]-pyridone
5-methylsulfinyl-4-ethyl-1-methylethylaminomethyl-3-amino-2[1H]-pyridone
5-carbamyl-4-methyl-1-[3-(ethylamino)propyl]-3-amino-2[1H]-pyridone
4-carboxymethyl-3-amino-1-[2-(dimethylamino)ethyl]-2[1H]-pyridone
3-amino-1-[2-(dimethylamino)ethyl]-6-methyl-2[1H]-pyridone-5-sulfonic acid
5-ethyl-1-dimethylaminomethyl-3-amino-2-pyridinethione
3-amino-1-[2-(acetamido)ethyl]-4-methyl-2[1H]-pyridone
5-amino-1-propionamidomethyl-4-methyl-2[1H]-pyridone
3-amino-1-[2-(acetamido)ethyl]-5-methyl-2[1H]-pyridone
3-amino-1-propionamidomethyl-5-chloro-2[1H]-pyridone
3-amino-1-[2-(acetamido)ethyl]-4-cyclopropyl-2[1H]-pyridone
3-amino-1-propionamidomethyl-4-methyl-6-t-butyl-2[1H]-pyridone
3-amino-1-[2-(acetamido)ethyl]-5,6-dimethyl-2[1H]-pyridone
3-amino-1-propionamidomethyl-4,5-dimethyl-2[1H]-pyridone
5-amino-1-[2-(acetamido)ethyl]-4-ethyl-2[1H]-pyridone
3-amino-1-propionamidomethyl-6-ethyl-5-methyl-2[1H]-pyridone
3-amino-1-[2-(acetamido)ethyl]-6-sec-butyl-2[1H]-pyridone
5-amino-1-propionamidomethyl-6-cyclobutyl-2[1H]-pyridone
5-amino-1-[2-(acetamido)ethyl]-6-methyl-2[1H]-pyridone
3-amino-1-propionamidomethyl-5-t-butyl-2[1H]-pyridone
5-amino-1-[2-(acetamido)ethyl]-4-t-butyl-2[1H]-pyridone
3-amino-1-propionamidomethyl-5-n-propyl-2[1H]-pyridone
3-amino-1-[2-(acetamido)ethyl]-4,5,6-trimethyl-2[1H]-pyridone
3-amino-1-propionamidomethyl-4,6-dimethyl-2[1H]-pyridone
3-amino-1-[2-(acetamido)ethyl]-5-trifluoromethyl-2[1H]-pyridone
3-amino-1-propionamidomethyl-5-methylsulfonyl-2[1H]-pyridone
5-amino-1-[2-(acetamido)ethyl]-3-methylthio-2[1H]-pyridone
3-amino-1-propionamidomethyl-4-ethyl-5-methylsulfinyl-2[1H]-pyridone
4-t-butyl-5-cyano-1-[2-(acetamido)ethyl]-3-amino-2[1H]-pyridone
5-bromo-4-ethyl-1-propionamidomethyl-3-amino-2[1H]-pyridone
6-methyl-1-[2-(acetamido)ethyl]-5-amino-3-trifluoromethyl-2[1H]-pyridone 5-methylsulfinyl-4-ethyl-1-[2-(acetamido)ethyl]-3-amino-2[1H]-pyridone The substituted pyridones and pyridines of the invention possess a high degree of anti-inflammatory, analgesic and antipyretic activity. They are of value in the treatment of arthritic and dermatological disorders or like conditions responsive to anti-inflammatory drugs. In general they are indicated for a wide variety of conditions where one or more of the symptoms of inflammation, fever and pain are manifested. Included within this category are diseases such as rheumatoid arthritis, osteo arthritis, gout, infectious arthritis and rheumatic fever. As indicated above the compounds of the invention also possess a useful degree of analgesic and antipyretic activity.

For these purposes the compounds of the invention may be administered orally, topically, parenterally, by inhalation spray or rectally in formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oil suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, such as calcium carbonate, sodium carbonate, lactose, calcium phosphate or sodium phosphate; granulating and disintegrating agents, for example maize starch, or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyoxyethylene sorbitan monooleate. The said aqueous suspensions may also contain one or more preservatives, for example ethyl, or n-propyl, p-hydroxy benzoate, one or more colouring agents, one or more flavouring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavouring agents may be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavouring and colouring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters of partial esters derived from fatty acids and hexitol anhydrides, for example sorbitan mono-oleate, and condensation products of the said partial esters with ethylene oxide, for example polyoxyethylene sorbitan monooleate. The emulsions may also contain sweetening and flavouring agents.

Syrups and elixirs may be formulated with sweetening agents, for example glycerol, sorbitol or sucrose. Such formulations may also contain a demulcent, a preservative and flavouring and colouring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The compounds of this invention may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

For topical use, creams, ointments, jellies, solutions or suspensions etc., containing the anti-inflammatory agents are employed.

Dosage levels of the order of 20 mg. to 7 grams per day are useful in the treatment of the above indicated conditions. For example, inflammation is effectively treated and anti-pyretic and analgesic activity manifested by the administration from about 0.3 to 100 milligrams of the compound per kilogram of body weight per day. Advantageously from about 2 mg. to about 50 mg. per kilogram of body weight and especially from about 4 mg. to about 20 mg./kg. per daily dosage produce highly effective results.

The amount of active ingredient that may be combined with the carrier materials to produce a single dosage form will vary depending upon the host treated and the particular mode of administration. For example, a formulation intended for the oral administration of humans may contain from 5 mg. to 5 grams of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion; drug combination and the severity of the particular disease undergoing therapy.

A convenient method for the preparation of the compounds of the invention as illustrated in Flow Sheet I involves, in general, oxidation of a pyridine (A) to the corresponding N-oxide (F). The N-oxide may be converted to the 2-[1H]-pyridone by heating with lower alkanoic anhydride which results in the formation of the 2-acyloxy pyridine which upon acid, neutral, or basic hydrolysis gives the 2[1H]-pyridone (E). Nitration of the pyridone (E) will result in the correspsonding nitropyridone (D). The nitropyridone (D) may be prepared in an alternative manner by amination of the pyridine (A) to produce the aminopyridine (B). The aminopyridine (B) may be either nitrated to produce an amino-nitropyridine (C) which is then diazotized to the nitropyridone (D) or alternatively the aminopyridine is initially converted to the pyridone (E) and then nitrated to produce the nitropyridine (D). Reduction of the nitropyridine (D) will result in the preparation of the aminopyridone (H) of the invention. One skilled in the art shall appreciate that the pyridones may be readily converted to the corresponding thiopyridones (L) by treatment with agents such as phosphorous pentasulfide. 1-Substituted aminopyridones may be prepared by reacting the nitropyridones (D) with a strong base such as sodium hydride in an inert atmosphere to activate the 1-nitrogen. Addition of an appropriate alkylating agents, etc.; results in the production of the corresponding N-substituted material (N). Reduction of the nitro group then yields the aminopyridone (M).

FLOW SHEET II

The enol-ethers and thioethers of the pyridones of this invention are prepared via a number of alternative routes including alkylation with diazoalkanes, alkylation or arylation of the silver salts and displacement of a halopyridine with an alkoxide (or aroxide) or alkylmercaptide (or arylmercaptide).

For example, a 2-halonitropyridine (T) is prepared by halogenation of the nitropyridone (D). Reaction with a metal alkoxide (aryloxide) or metal alkylmercaptide (arylmercaptide) produces the nitropyridine of the formula (R). Reduction of the nitropyridine results in the aminopyridine (S). N-acylation of the primary amine using, for example, an acid anhydride produces the acyl-substituted amines of the formula (T). Cleavage of the enol-ether or thioether employing, for example, borontribromide results in the preparation of the pyridones and thiopyridones of the formula (X). The N-1 substituted derivatives of compound (X) are prepared in accordance with the teachings of Flow Sheet I resulting in the production of compound (Z).

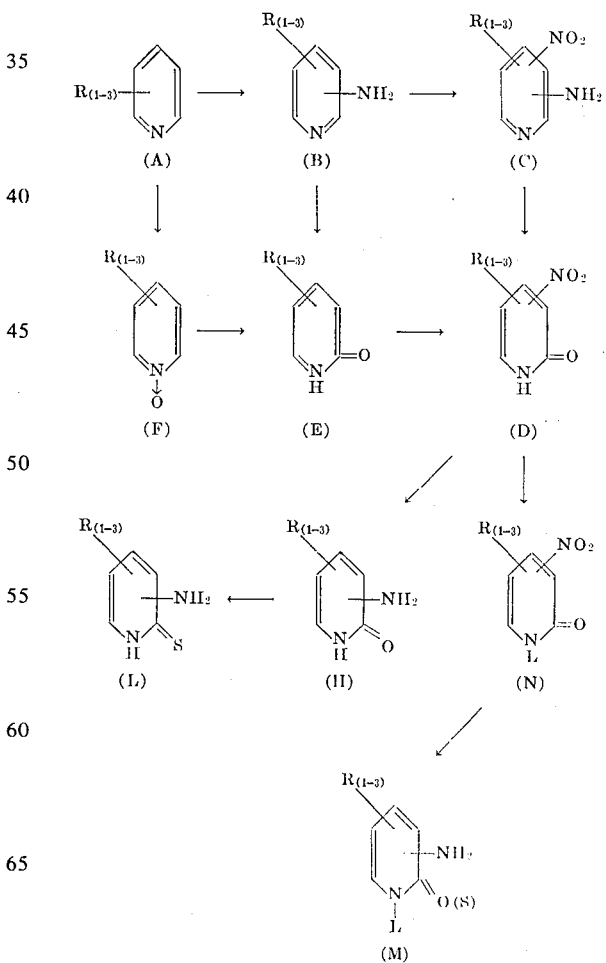

FLOW SHEET I

L, $R_1$, $R_2$, $R_3$ are as indicated above.

FLOW SHEET II (D) → (T) → (R) → (S) → (W) → (X) → (Z)

L, R, X, Z and F are as indicated above.

In the examples which follow, non-limiting illustrations of procedures for producing the compounds of the invention are provided.

EXAMPLE 1

Preparation of 2-amino-4-ethylpyridine

To a stirred suspension of freshly prepared sodamide (from 24 g. sodium) in dimethylaniline (90 ml.) [prepared via procedure of Organic Reactions, Vol. I] is added 4-ethylpyridine (0.8 m.) and the resultant mixture heated slowly to ca. 155°. After hydrogen evolution has noticably slowed, the reaction is allowed to continue for 5 hours and cooled. The mixture is decomposed with 5% sodium hydroxide solution (160 ml.) and extracted with benzene. The benzene extracts are dried, concentrated in vacuo, and the oily residue fractionally crystallized from ether-petroleum ether to give 2-amino-4-ethylpyridine.

When other alkylpyridines, such as the picolines, propylpyridine, 3 or 4-t-butylpyridine, 2,3-dimethylpyridine, 3,4-dimethylpyridine, 3,5,6-trimethylpyridine, 4,5,6-trimethylpyridine, the methylethylpyridines, 2-n-butylpyridine, etc., are treated as above, the corresponding α-aminopyridine is obtained, respectively.

EXAMPLE 2

Preparation of 2-amino-4-ethyl-3-nitropyridine

To an ice-cooled, stirred mixture of the 2-amino-4-ethylpyridine (0.19 m.) of Example 1 in concentrated sulfuric acid (120 ml.) is added concentrated nitric acid (15.2 ml.) in sulfuric acid (30 ml.) over ca. 1.3 hours, keeping the temperature of the mixture less than 6°C. After warming to room temperature, the mixture is slowly heated to 92°, kept 3 hours at this temperature, cooled and then added to 2 l. of ice. The mixture is then basified with concentrated ammonium hydroxide. The mixture obtained is extracted with chloroform, the chloroform is removed in vacuo, and the residue steam distilled. The distillate is collected until the pot is void of the more volatile isomer. Extraction of the distillate with methylene chloride yields 2-amino-4-ethyl-3-nitropyridine.

Extraction of the pot-residue with chloroform yields crude 5-nitro isomer which is purified via column chromatography. Alternatively, the crude material is extracted with dilute sulfuric acid, filtered, and the filtrate collected.

When other alkylated 2-aminopyridines, such as 2-amino-6-ethypyridine, 2-amino-4,5-or 6-methylpyridines, 2-amino-4-propylpyridine, 2-amino-4,5-dimethylpyridine, 2-amino-5,6-dimethylpyridine, 2-amino-4,5,6-trimethylpyridine, 2-amino-4,6-dimethyl-5-ethylpyridine, 2-amino-6-pentylpyridine, 2-amino-6-methyl-5-propylpyridine, etc. are nitrated as above, the corresponding aminonitro-alkylpyridines are obtained.

For example, replacing the 2-amino-4-ethylpyridine in the above procedure with the following:
2-amino-5-methylpyridine
2-amino-4,5,6-trimethylpyridine
2-amino-4-ethyl-5-fluoropyridine
2-amino-5-ethyl-6-trifluoromethylpyridine
yields respectively:
2-amino-3-nitro-5-methylpyridine
2-amino-3-nitro-4,5,6-trimethylpyridine
2-amino-3-nitro-4-ethyl-5-fluoropyridine
2-amino-3-nitro-5-ethyl-6-trifluoromethylpyridine

EXAMPLE 3

Preparation of 4-ethyl-3-nitro-2[1H]-pyridone

To a stirred solution of the 2-amino-4-ethyl-3-nitropyridine (0.032 m.) of Example 2 in a sulfuric acid (9 ml.) water (90 ml.) mixture at 5°C. is added a concentrated aqueous solution of sodium nitrite (2.4 g., 0.033 m.) while keeping the temperature below 10°C. by external cooling. The mixture is allowed to warm to room temperature, heated to 45°C., cooled, filtered and the collected product washed with water and dried to give 4-ethyl-3-nitro-2[1H]-pyridone. Recrystallization yields the pure material.

When the sulfuric acid solution of the 5-nitroisomer (Example 2) is used above, 4-ethyl-5-nitro-2[1H]-pyridone is obtained.

When the nitro-aminopyridines of Example 2, or the aminopyridines of Example 1 are diazotized as above, the corresponding alkyl nitro pyridones and alkylpyridones are obtained.

EXAMPLE 4

Preparation of 4-t-butylpyridine-N-oxide

To a stirred solution of 4-t-butylpyridine (27 g., 0.2 m.) in glacial acetic acid (100 ml.) at 33°C. is added 30% aqueous hydrogen peroxide (25 ml.) and the resultant mixture heated to ca. 75°C. Additional (30 ml.) 30% peroxide is added and the reaction mixture heated overnight, cooled and solid sodium bisulphite added to destroy the excess peroxide. The mixture is then concentrated in vacuo to a residue. Chloroform is added, and the mixture stirred with anhydrous sodium carbonate until all acetic acid traces are neutralized. The mixture is then filtered, and the chloroform solution concentrated in vacuo to a golden yellow oil which crystallizes to a hygroscopic white waxy solid on standing identified as 4-t-butylpyridine-N-oxide.

When the alkylpyridine starting materials of Example 1 are treated as above, the corresponding alkylpyridine-N-oxides are obtained.

For example, when the alkylpyridines such as the picolines, 3-propylpyridine, 3-t-butylpyridine, 2,3-dimethylpyridine, 3,4-dimethylpyridine, 3,5,6-trimethylpyridine, 4,5,6-trimethylpyridine, the methylethylpyridines, 2-n-butylpyridine, 5-methylpyridine, 4-ethyl-5-fluoropyridine, 5-ethyl-6-trifluoromethylpyridine, etc. are employed in the above reaction in place of 4-t-butylpyridine the corresponding N-oxides are obtained.

EXAMPLE 5

Preparation of 4-t-butyl-2[1H]-pyridone

A mixture of the 4-t-butylpyridine-N-oxide of Example 4 (12 g., 0.08 m.) and acetic anhydride (35 ml.) is stirred and heated at gentle reflux for eighteen hours (nitrogen atmosphere). On cooling, the mixture is added to ice-water (300 ml.). Solid sodium bicarbonate is then added to basify the mixture and the mixture cooled and filtered to yield 4-t-butyl-2[1H]-pyridone. Extraction of the aqueous mother liquors with chloroform yields additional product. Recrystallization from acetone yields pure material, m.p. 139–140.5°C.

As an alternative method of preparing the pyridone one may react the N-oxide with sulfuryl chloride (or equivalent) to obtain the 2-chloropyridine. Hydrolysis of the chloro group yields the corresponding pyridone.

EXAMPLE 6

Preparation of 4-t-butyl-5-nitro-2[1H]-pyridone

To a stirred solution of 4-t-butylpyridone obtained from Example 5 (1.5 g., 0.01 m.) in concentrated sulfuric acid (15 ml.) at ice-bath temperatures is added concentrated nitric acid (0.9 ml., 0.01 m.) dropwise over ca. 30 minutes. The solution is allowed to warm to room temperature overnight and then added to ice-water (250 ml.) in small portions. The solution is then filtered, washed with water and dried to give a pale yellow solid. N.m.r. indicates ca. 4:1 ratio of 5-nitro to 3-nitro isomer. Recrystallization from ether yields 4-t-butyl-5-nitro-2[1H]-pyridone, m.p. 140°–144°C.

When the pyridones of Examples 3 and 5 are nitrated as above, the corresponding nitropyridones are obtained.

For example, replacing the 4-t-butylpyridone in the above procedure with the following:
5-methyl-2[1H]-pyridone
4-ethyl-5-fluoro-2[1H]-pyridone
yields respectively:
5-methyl-3-nitro-2[1H]-pyridone
4-ethyl-5-fluoro-3-nitro-2[1H]-pyridone

EXAMPLE 7

Preparation of 5-bromo-4-ethyl-3-nitro-2[1H]-pyridone

To a stirred mixture of 4-ethyl-3-nitro-2[1H]-pyridone (0.06 m.) in chloroform (100 ml.) acetic acid (100 ml.) at 2°C. is added a chloroform (20 ml.) solution of bromine (9.6 g., 0.06 m.) over 75 minutes while keeping the temperature below 5°C. After addition, the mixture is allowed to warm to room temperature overnight. The mixture is concentrated in vacuo, the residue triturated with dilute sodium bicarbonate solution, and the 5-bromo-4-ethyl-3-nitro-2[1H]-pyridone collected.

It may be noted that N-bromosuccinimide may be used in place of bromine in the above reactions with the mixture being heated in chloroform until succinimide precipitation is complete.

Treatment of the pyridones of Examples 3, 5, and 6 in accordance with the above process will result in the production of the corresponding 3 (or 5) bromopyridones.

EXAMPLE 8

Preparation of 5-methylthio-4-ethyl-3-nitro-2[1H]-pyridone

5-Bromo-4-ethyl-3-nitro-2[1H]-pyridone (0.05 m.) is added to a mixture of copper methylmercaptide (from 0.05 m. Copper) in 2,4-lutidine (30 ml.) and the resultant mixture refluxed for 20 hrs. After removal of the lutidine in vacuo, the residue is taken up in chloroform, washed with dilute ammonium hydroxide and water, dried and then concentrated in vacuo to a residue. Chromatography of the residue on an alumina column using a methanol-methylene chloride system (v/v 0–15% methanol) as eluant yields 4-ethyl-5-methylthio-3-nitro-2[1H]-pyridone.

When other mercaptides, e.g., copper ethyl-, propyl-, butyl-, etc. mercaptide are used in place of copper methylmercaptide in the above example, the corresponding alkylmercaptopyridone is obtained.

When the halopyridones of Example 7 are reacted with mercaptide as above, the corresponding mercaptopyridones are obtained.

EXAMPLE 9

Preparation of 4-t-butyl-5-cyano-3-nitro-2[1H]-pyridone

A mixture of 5-bromo-4-t-butyl-3-nitro-2[1H]-pyridone (0.02 m.), cuprous cyanide (0.025 m.) and N-methylpyrrolidone is deaerated, covered with a nitrogen atmosphere and heated slowly to 180°C. The mixture is kept at this temperature for 3 hrs, cooled and then partitioned between chloroform - 7% hydrochloric acid containing ferric chloride (0.035 m.). The chloroform layer is separated, dried, filtered and concentrated in vacuo to crude 4-t-butyl-5-cyano-3-nitro-2[1H]-pyridone which is then purified via column chromatography on silica gel, using a methanolmethylene chloroide system (v.v 0–10% methanol) as eluant.

When the halopyridones of Example 7 are reacted with cuprous cyanide as above, the corresponding cyano pyridones are obtained.

EXAMPLE 10

Preparation of 4-ethyl-3-amino-2[1H]-pyridone

A mixture of 4-ethyl-3-nitro-2[1H]pyridone (1.5 g.), methanol (75 ml.) and Raney nickel is reacted in a 40 p.s.i. hydrogen atomsphere at room temperature until hydrogen uptake is complete. The mixture is filtered under nitrogen, concentrated in vacuo to an oily crust and taken up in chloroform. After filtering, the chloroform is removed in vacuo to yield 4-ethyl-3-amino-2[1H]-pyridone.

Palladium on carbon may be used in place of nickel in the above procedure.

When the nitropyridones of Examples 3, 6, 8 and 9 are reduced as above, the corresponding aminopyridones are obtained.

EXAMPLE 11
Preparation of
5-chloro-3-amino-4-methyl-2[1H]pyridone

A stirred mixture of 3-nitro-4-methyl-2[1H]-pyridone (0.5 g.), methylene chloride (4.5 ml.), and N-chlorosuccinimide (0.4 ml., 0.003+ m.) is stirred at room temperature under a nitrogen atmosphere for 27 hours, followed by gentle refluxing for 8 hours. The mixture is then diluted with fresh methylene chloride and washed with water. The methylene chloride layer is dried and concentrated to a residue. Chromotography of the material on a silica gel column using a methanol-methylene chloride system as eluant yields 5-chloro-3-nitro-4-methyl-2[1H]pyridone. Reduction in accordance with Example 10 followed by chromotography yields 5-chloro-3-amino-4-methyl-2[1H]pyridone.

When the amines of Example 10 are treated as above, the corresponding chloro compounds are obtained. Use of N-bromosuccinimide yields the bromo compounds.

EXAMPLE 12
Preparation of
6-methyl-5-amino-3-trifluoromethyl-2[1H]-pyridone

A. A mixture of 3-carboxy-6-methyl-2[1H]-pyridone (6.0g.), phosphorous pentachloride (17 g.) and phosphorous oxychloride (50 ml.) is heated gently on the steam-cone overnight. The excess phosphorous oxychloride is removed in vacuo, dry toluene added and removed in vacuo the residue taken up in ether, filtered and concentrated to crude 2-chloro-6-methylnicotinoyl chloride used in (B).

B. A mixture of the above acid chloride (6 g.), sulfur tetrafluoride (20 g.) and hydrogen fluoride (4 g.) is heated at 120°C. for 17 hours in a stainless steel bomb, cooled, evacuated to a residue and the residue carefully basified, cold, with 2.5 N sodium hydroxide solution. The mixture is extracted with ChCl$_3$, and the chloroform removed in vacuo to yield the crude 2-chloro-6-methyl-3-trifluoromethylpyridine, purified via chromatography on a silica gel column.

C. A stirred mixture of the above 2-chloropyridine (0.02 m.), silver acetate (0.021 m.) and acetic acid (35 ml.) is refluxed gently for 75 hours, filtered, hot water (5 ml.) added, and the mixture heated on the steam cone for two hours to hydrolyze the 2-acetoxy intermediate. The mixture is then concentrated in vacuo, and the residue chromatographed on a silica gel column using methanol-methylene chloride system (v/v 0–15% methanol) as eluant to yield 6-methyl-3-trifluoromethyl-2[1H]-pyridone. The material is then nitrated according to the procedure of Example 6 to yield 6-methyl-5-nitro-3-trifluoromethyl-2[1H]-pyridone and reduced according to Example 10 to produce 6-methyl-5-amino-3-trifluoromethyl-2[1H]-pyridone.

EXAMPLE 13
Preparation of
3-acetyl-5-amino-6-methyl-2[1H]-pyridone

To a freshly prepared methylmagnesium iodidebenzene mixture (from 9.6 g. magnesium turnings in ether-replaced with 250 ml. benzene) is added a slurry of 3-cyano-6-methyl-2[1H]-pyridone (13 g.) in benzene (100 ml.), and the mixture refluxed for 5 hours. The mixture is then poured into water-ice containing acetic acid (40 ml.), the solid collected, dissolved in 30 ml. warm 2.5 N hydrochloric acid, filtered, and basified with ammonium hydroxide. Cooling and filtering followed by recrystallization from ethanol yields 3-acetyl-6-methyl-2[1H]-pyridone, m.p 201°–202°C.

When other Grignard reagents are used in place of methylmagnesium iodide in the above reaction, the corresponding ketone is obtained.

When other substituted cyanopyridones are treated as above, the correspondingly substituted acylpyridone is obtained. Nitration according to the procedure of Example 6 yields 3-acetyl-5-nitro-6-methyl-2[1H]-pyridone. The nitro material is reduced according to Example 10 to yield 3-acetyl-5-amino-6-methyl-2[1H]-pyridone.

EXAMPLE 14
Preparation of
5-amino-3-α-hydroxyethyl-6-methyl-2[1H]-pyridone

To a mixture of 3-acetyl-5-amino-6-methyl-2[1H]-pyridone (0.02 m.) in ethanol (100 ml.) at 3°C. is added a solution of sodium borohydride (0.8 g.) in ethanol (8 ml.)-water (0.5 ml.) over 6 minutes. The mixture is allowed to warm to room temperature and stirred overnight. Acetic acid (2 ml.) is then added, and the solvents removed in vacuo. Distribution of the oil obtained between methylene chloride-dilute sodium bicarbonate solution, followed by removal of the methylene chloride in vacuo yields 5-amino-3-a-hydroxyethyl-6-methyl-2[1H]-pyridone.

EXAMPLE 15

Preparation of 3-acetamide-4-methyl-2[1H]-pyridone and N-(4-methyl-2[1H]-pyridone-3-yl)acetimide A mixture of 4-methyl-3-nitro-2[1H]-pyridone (3.0 g., 0.02 m.), acetic anhydride (100 ml.), acetic acid (0.5 ml.) and 5% palladium on carbon (1.0 g.) is reacted in a hydrogen atomosphere (40 p.s.i.) at room temperature. When the theoretical amount of hydrogen has been absorbed, the mixture is filtered and concentrated in vacuo to ca. 10 g. The oil is then added to iced water (50 ml.), stirred overnight, and the aqueous mixture concentrated in vacuo to a thick oil that solidifies on trituration with ether to yield a white solid. Fractional recrystallization from acetone yields the acetate, 3-acetamido-4-methyl-2[1H]-pyridone, m.p. 218°–220.5°C., and the imide, N-(4-methyl-2[1H]-pyridone-3-yl)-acetimide, m.p. 159°–163°C.

EXAMPLE 16

Preparation of
5-methylsulfinyl-4-ethyl-3-amino-2[1H]-pyridone

To an ice-cooled solution of 5-methylthio-4-ethyl-3-nitro-2[1H]-pyridone (0.01 m.) in methanol-acetone is added a solution of sodium metaperiodate (0.012 m.) in a minimum of water. The mixture is stirred below 8°C. until precipitation of sodium iodate is completed.

The sodium iodate is then removed by filtration, the solvents removed in vacuo, the residue taken up in chloroform and the chloroform solution dried, filtered and concentrated to crude 5-methylsulfinyl-4-ethyl-3-nitro-2[1H]-pyridone. The crude material is purified via recrystallization or chromatography on a silica gel column. Reduction according to Example 10 yields 5-methylsulfinyl-4-ethyl-3-amino-2[1H]-pyridone.

Use of excess metaperiodate at elevated temperatures, followed by chromatography, yields 5-methylsulfonyl-4-ethyl-3-nitro-2[1H-pyridone. The sulfonyl may also be obtained utilizing peroxide in acetic acid.

The alkylthiopyridones, prepared via the procedure of Example 8, yield the sulfoxide or sulfone when reacted as above. For example, 5-methylthio-3-nitro-2[1H]-pyridone yields 5-methylsulfinyl-3-nitro-2[1H]-pyridone and the corresponding sulfone, etc.

EXAMPLE 17

Preparation of
3-amino-6-ethyl-5-nitro-2[1H]-pyridone

When 3-amino-6-ethyl-2[1H]-pyridone is nitrated as per Example 6, and the aqueous quench neutralized with ammonium hydroxide, 3-amino-6-ethyl-5-nitro-2[1H]-pyridone is obtained.

Reduction (palladium on carbon catalyst) of this material at room temperature yields the 5-amino analog.

EXAMPLE 18

Preparation of
5-methoxy-1,6-dimethyl-3-nitro-2[1H]-pyridone

A mxiture of 5-bromo-1,6-dimethyl-3-nitro-2[1H]-pyridone (0.03 m.), sodium methoxide (0.06 m.) and methanol is heated for 8 hrs. at 150°C. in a sealed tube and then cooled. The mixture is made slightly acidic, concentrated in vacuo, and the residue chromatographed on a silica gel column using a methanol-methylene chloride system (v/v 0–20% methanol) as eluant to yield 5-methoxy-1,6-dimethyl-3-nitro-2[1H]-pyridone.

When sodium methoxide is replaced by other alkoxides in the above reaction, the corresponding alkoxypyridone is obtained.

Reduction according to Example 10 will yield the corresponding amino compound.

EXAMPLE 19

Preparation of
5-carbamyl-4-methyl-3-nitro-2[1H]-pyridone

5-Cyano-4-methyl-3-nitro-2[1H]-pyridone (0.02 m.) is added in small portions to cold, stirred sulfuric acid (25 ml.). The mixture is stirred for 1 hr. after solution is attained, and then added to chopped ice, filtered, washed well with water and dried to yield 5-carbamyl-4-methyl-3-nitro-2[1H]-pyridone. Reduction of this material yields the 3-amino analog.

EXAMPLE 20

Preparation of
4-carboxymethyl-3-amino-2[1H]-pyridone

To a mixture of 4-methyl-3-nitro-2[1H-pyridone (0.02 m.) in freshly distilled tetrahydrofuran in an icebath is added n-butyllithium (0.042 m.) in hexane. The resulting mixture is allowed to stir for 30 minutes and is then added slowly to a stirred tetrahydrofuran-dry ice (excess) mixture. After 1 hour, the solvent is removed in vacuo, the residue partitioned between sodium carbonate-chloroform, the carbonate solution filtered and neutralized with dilute hydrochloric acid to yield 4-carboxymethyl-3-nitro-2[1H]-pyridone. Purification is effected via chromatography of the corresponding methyl ester, or via recrystallization. Reduction in accordance with the process of Example 10 yields 4-carboxymethyl-3-amino-2[1H]-pyridone.

EXAMPLE 21

Preparation of
4-t-butyl-1-methyl-3-amino-2[1H]pyridone

To an ice-cooled, stirred mixture of 4-t-butyl-3-nitro-2[1H]-pyridone (0.02 m.) in dimethyl-formamide (80 ml.) (nitrogen atomosphere) is added sodium hydride dispersion (0.02 m.) and the mixture stirred cold until hydrogen evolution has ceased and salt formation is complete. Methyl iodide (0.022 m.) is then added to the stirred salt mixture in portions so as to keep the temperature less than 10°C. The mixture is then allowed to warm to room temperature overnight, added to ice-water (200 ml.) containing acetic acid (1 ml.), filtered and the filtrate extracted with chloroform. The chloroform extracts are washed with water, dried and concentrated to a residue. Chromatography (silica gel) of the combined residue and original filter cake yields pure 4-t-butyl-1-methyl-3-nitro-2[1H]-pyridone. Reduction according to Example 10 yields the corresponding amine; 3-amino-4-t-butyl-1-methyl-2[1H]pyridone.

Methylation is also achieved via heating the pyridone in ethanolic potassium hydroxide with excess methyliodide.

When ethyl-, propyl-, butyl-, methallyl-, 2-chloroallyl-, propargyl-, benzyl-, substituted benzyl-, phenethyl-, 3-hydroxypropyl-, 2-chloroethyl-, cinnamyl-, thenyl-, furfuryl-, substituted thenyl- and furfuryl-, such as 5-methylthenyl- and 4,5-diethylfurfuryl-, pyridylmethyl-, and substituted pyridylmethylbromides (iodides or chlorides) are used in place of methyliodide in the above examples, the corresponding N-substituted-pyridone is obtained.

When methyl bromoacetate is used, or when bromo or chloroacetic acid is used in the refluxing ethanoic potassium hydroxide procedure, the corresponding N-acetic acid or ester is obtained. The use of a dialkylaminoalkyl halide in the above process results in the production of the corresponding N-dialkylaminoalkyl pyridone.

EXAMPLE 22

Preparation of
4-t-butyl-3-amino-1-phenyl-2[1H]-pyridone

A. The sodium salt of 4-t-butyl-3-nitro-2[1H]-pyridone is prepared via the procedures of Example 21. After hydrogen evolution is completed, the solvent is removed in vacuo to leave the salt as a residue.

B. Iodobenzene (0.03 m.) and copper powder (0.8 g.) is added to the salt and the mixture heated at gentle reflux for 16 hrs. The mixture is cooled, chloroform added, the mixture filtered, concentrated in vacuo and the residual material chromatographed on a silica gel column using a methanol-methylene chloride system (v/v 0–17% methanol) as eluant to yield 4-t-butyl-3-nitro-1-phenyl-2[1H]-pyridone. Reduction carried out according to Example 10 yields 3-amino-4-t-butyl-1-phenyl-2[1H]-pyridone.

When substituted halobenzenes, such as iodonitrobenzene, bromo-(trifluoromethyl)-benzene, (dimethylamino)-iodobenzene, etc. are used above in place of iodobenzene, the correspondingly 1-(substituted phenyl)-2[1H]-pyridones are obtained.

When the pyridones of Examples 3, 5, 6, 8, 9, are reacted as above, the correspnding 1-(phenyl and substituted-phenyl)-2[1H]-pyridones are obtained.

EXAMPLE 23

Preparation of 5-ethyl-3-amino-1-tetrahydropyranyl-2[1H]-pyridone

A solution of 5-ethyl-3-nitro-2[1H]-pyridone (0.03 m) in benzene (100 ml.) containing enough dimethylformamide for solution is treated with anhydrous p-toluenesulfonic sulfonic acid (0.2 g.), followed by dihydropyran (0.3 m.) in benzene at room temperature. The mixture is then heated at ca. 70°C. for 6 hrs., cooled, benzene added (150 ml.), and the mixture extracted with dilute 0.5% sodium hydroxide, water (5 times), dried and concentrated in vacuo to 5-ethyl-3-nitro-1-tetrahydropropyanyl-2[1H]-pyridone which is then reduced in neutral media to yield 5-ethyl-3-amino-1-tetrahydropyranyl-2[1H]-pyridone.

EXAMPLE 24

Preparation of 3-amino-6-methyl-2[1H]-pyridone-5-sulfonic acid

A. 3-Nitro-6-methyl-2[1H]-pyridone is converted to 3-nitro-6-methyl-2[1H]-pyridone-5-sulfonic acid with chlorosulfonic acid via the procedure of German Patent No. 601,896. Reduction according to Example 10 yields 3-amino-6-methyl-2[1H]pyridone-5-sulfonic acid.

Preparation of 3-amino-6-methyl-2[1H]-pyridone-5-sulfonamide

B. The sulfonic acid from (A) is then converted to the methyl ester with diazomethane (1 equiv.), and the ester heated with concentrated ammonium hydroxide (aqueous) in a sealed glass tube at 150°C. for 10 hours, yielding 3-nitro-6-methyl-2[1H]-pyridone-5-sulfonamide, which is then reduced according to the procedure of Example 10 to yield 3-amino-6-methyl-2[1H]-pyridone-5-sulfonamide.

When dimethylamine, ethylamine, etc. are used in place of ammonium hydroxide in the above reaction, the corresponding substituted sulfonamide is obtained.

EXAMPLE 25

Preparation of 5-ethyl-3-amino-2-pyridinethione

A mixture of 5-ethyl-3-amino-2[1H]-pyridone (0.02 m.), phosphorous pentasulfide (1.9 g.) and pyridine (35 ml.) is refluxed gently for 3 hours, the mixture concentrated in vacuo and the residue partitioned between chloroform-water. The chloroform layer is dried, filtered and concentrated in vacuo to a residue and the residue chromatographed on a silica gel column using a methanol-methylene chloride system (v/v 0–20% methanol) as eluant to yield 5-ethyl-3-amino-2-pyridinethione.

One skilled in the art will readily appreciate that when the pyridones recited in the foregoing Examples are used in place of 5-ethyl-3-aminopyridone in the above procedure, the corresponging pyridinethione is obtained.

EXAMPLE 26

Preparation of 6-benzylthio-3-amino-2[1H]-pyridonbe

A mixture of 3-nitro-6-chloro-2[1H]-pyridone (13 g.), benzylmercaptan (13 g.), triethylamine (15 ml.) and benzene (150 ml.) in a stainless steel bomb is heated at 170°C. for 8 hrs. The mixture is allowed to cool, the benzene and excess reagents allowed to evaporate in the hood draft and the residue distributed between chloroform-water, filtered, and the chloroform layer concentrated in vacuo to 6-benzylthio-3-nitro-2[1H]pyridone. Reduction yields 6-benzylthio-3-amino-2[1H]-pyridone.

EXAMPLE 27

Preparation of 3-amino-5-ethyl-2-methoxypyridine

A. A mixture of 3-nitro-5-ethyl-2[1H]-pyridone (0.04 m.), phosphorous pentachloride (0.02 m.) and phosphorous oxychloride (20 ml.) is heated on the steam cone for 3 hrs. The mixture is cooled, added to crushed ice (100 ml.), basified to pH 8 with ammonium hydroxide, and the aqueous mixture extracted with chloroform. The chloroform extracts are dried and concentrated in vacuo to 2-chloro-3-nitro-5-ethylpyridine.

B. The chloropyridine from (A) and methanolic sodim methoxide (from 1.1 g. sodium and 50 ml. methanol) are refluxed together for 15 hours and concentrated in corresponding The residue is chromatographed on a silica gel column using an ether-petroleum ether system (v/v 0–60-pyridone ether) as eluant to yield 3-nitro-5-ethyl-2-methoxypyridine. Reduction yields 3-amino-5-ethyl-2-methoxypyridine.

EXAMPLE 28

Preparation of 3-fluoro-5-amino-4-methyl-2[1H]-pyridone

A. 3-Fluoro-4-methyl pyridine is converted to the N-oxide via the procedure of Example 4.

B. To an ice-cooled, stirred portion (25 ml.) of sulfuryl chloride is added 3-fluoro-4-methyl pyridine-N-oxide (2.5 g., 0.02 m.) in small portions. Solution occurs, followed by rapid precipitation of a yellow solid. The mixture is allowed to warm to room temperature, then refluxed for 3 hours. The mixture is then cooled, added to ice (200 g.), and the mixture basified with ammonium hydroxide. The mixture is then extracted with ether and the ether extracts dried and concentrated to an oil which is chromatographed on a silica gel column using an ether-petroleum ether system (v/v 0–20%) to yield 2-chloro-3-fluoro-4-methylpyridine and the 6-chloro isomer.

C. When the above 2-chloropyridine is hydrolyzed via the procedure of Example 12 C, 3-fluoro-4-methyl-2[1H]-pyridone is obtained. The 5-fluoro isomer is obtained from the 6-chloropyridine.

Conversion to the amino compounds of the invention is effected in accordance with Examples 6 and 10 yielding 3-fluoro-5-amino-4-methyl-2[1H]-pyridone.

The invention is further demonstrated by the following examples in which all parts are by weight.

EXAMPLE 29

Preparation of 4-t-butyl-1,3-diamino-2[1H]-pyridone

The sodium salt of 4-t-butyl-3-nitro-2[1H]-pyridone (from Example 22 A) is added to a cold chloramine solution (prepared from 0.02 m. sodium hypochlorite solution via the procedure of Hoegerle and Erlenmeyer, Helv. 39 1208 (1956) and allowed to stir cold overnight. Concentration of the chloroform solution obtained by continuous extraction of the reaction mixture yields 1-amino-4-t-butyl-3-nitro-2[1H]-pyridone.

Alternately, treatment of the corresponding pyrone with hydrazine via procedures well known to those in the art gives the same 1-aminopyridone.

Reduction as in Example 10 yields 4-t-butyl-1,3-diamino-2[1H]-pyridone.

Following the above procedure, other representative 1-aminopyridones of the invention may be prepared. For example, when the sodium salt of the following nitropyridones is reacted in accordance with the above procedure:
  3-nitro-4-methyl-2[1H]-pyridone
  5-nitro-4-methyl-2[1H]-pyridone
  3-nitro-4-t-butyl-2[1H]-pyridone
  3-nitro-4-methyl-6-t-butyl-2[1H]-pyridone
  3-nitro-5,6-dimethyl-2[1H]-pyridone
  5-nitro-4-ethyl-2[1H]-pyridone
  3-nitro-6-ethyl-5-methyl-2[1H]-pyridone
  3-nitro-5-t-butyl-2[1H]-pyridone
  3-nitro-4,5,6-trimethyl-2[1H]-pyridone
  3-nitro-5-trifluoromethyl-2[1H]-pyridone
  4-t-butyl-5-cyano-3-nitro-2[1H]-pyridone
  5-bromo-4-methoxy-3-nitro-2[1H]-pyridone
  6-methyl-5-nitro-3-trifluoromethyl-2[1H[-pyridone
the following 1-aminopyridones are obtained:
  1,3-diamino-4-methyl-2[1H]-pyridone
  1,5-diamino-4-methyl-2[1H]-pyridone
  1,3-diamino-4-t-butyl-2[1H]-pyridone
  1,3-diamino-4-methyl-6-t-butyl-2[1H]-pyridone
  1,3-diamino-5,6-dimethyl-2[1H]-pyridone
  1,5-diamino-4-ethyl-2[1H]-pyridone
  1,3-diamino-6-ethyl-5-methyl-2[1H]-pyridone
  1,3-diamino-5-t-butyl-2[1H]-pyridone
  1,3-diamino-4,5,6-trimethyl-2[1H]-pyridones
  1,3-diamino-5-trifluoromethyl-2[1H]-pyridone
  4-t-butyl-5-cyano-1,3-diamino-2[1H]-pyridone
  5-bromo-4-methoxy-1,3-diamino-2[1H]-pyridone
  6-methyl-1,5-diamino-3-trifluoromethyl-2[1H]-pyridone

EXAMPLE 30

Preparation of 4-t-butyl-1-[2-(dimethylamino)ethyl]-3-amino-2[1H]-pyridone

To an ice-cooled, stirred mixture of 4-t-butyl-3-nitro-2[1H]-pyridone (0.02 m.) in dimethylformamide (80 ml.) (nitrogen atmosphere) is added sodium hydride dispersion (0.02 m.) and the mixture stirred cold until hydrogen evolution has ceased and salt formation is complete. 2-(Dimethylamino)ethyl chloride (0.022 m.) is then added to the stirred salt mixture in portions so as to keep the temperature less than 10°C. The mixture is then allowed to warm to room temperature overnight, added to ice-water (200 ml.), filtered and the filtrate extracted with chloroform. The chloroform extracts are washed with water, dried and concentrated to a residue.

Chromatography (silica gel) of the combined residue and original filter cake yields pure 4-t-butyl-1-[2-(dimethylamino)ethyl]-3-nitro-2[1H]-pyridone. Reduction according to Example 10 yields the corresponding amine; 3-amino-4-t-butyl-1-[2-(dimethylamino)ethyl]-2[1H]-pyridone.

Following the above procedure, other representative 1-dialkylaminoalkyl and 1-alkylaminoalkyl pyridones of the invention may be prepared. For example, when the following nitropyridones are reacted with dimethylaminoethylchloride in accordance with the above procedure:
  3-nitro-4-methyl-2[1H]-pyridone
  5-nitro-4-methyl-2[1H]-pyridone
  3-nitro-5-methyl-2[1H]-pyridone
  3-nitro-5-chloro-2[1H]-pyridone
  3-nitro-4-t-butyl-2[1H]-pyridone
  3-nitro-4-methyl-6-t-butyl-2[1H]-pyridone
  3-nitro-5,6-dimethyl-2[1H]-pyridone
  3-nitro-4,5-dimethyl-2[1H]-pyridone
  5-nitro-4-ethyl-2[1H]-pyridone
  3-nitro-6-ethyl-5-methyl-2[1H]-pyridone
  3-nitro-6-sec-butyl-2[1H]-pyridone
  5-nitro-6-ethyl-2[1H]-pyridone
  5-nitro-6-methyl-2[1H]-pyridone
  3-nitro-5-t-butyl-2[1H]-pyridone,
the following dimethylaminomethyl pyridones are obtained:
  3-amino-1-dimethylaminoethyl-4-methyl-2[1H]-pyridone
  5-amino-1-dimethylaminomethyl-4-methyl-2[1H]-pyridone
  3-amino-1-dimethylaminomethyl-5-methyl-2[1H]-pyridone
  3-amino-1-dimethylaminomethyl-5-chloro-2[1H]-pyridone
  3-amino-1-dimethylaminomethyl-4-t-butyl-2[1H]-pyridone
  3-amino-1-dimethylaminomethyl-4-methyl-6-t-butyl-2[1H]-pyridone
  3-amino-1-dimethylaminomethyl-5,6-dimethyl-2[1H]-pyridone
  3-amino-1-dimethylaminomethyl-4,5-dimethyl-2[1H]-pyridone
  5-amino-1-dimethylaminomethyl-4-ethyl-2[1H]-pyridone
  3-amino-1-dimethylaminomethyl-6-ethyl-5-methyl-2[1H]-pyridone
  3-amino-1-dimethylaminomethyl-6-sec-butyl-2[1H]-pyridone
  5-amino-1-dimethylaminomethyl-6-ethyl-2[1H]-pyridone
  5-amino-1-dimethylaminomethyl-6-methyl-2[1H]-pyridone
  3-amino-1-dimethylaminomethyl-5-t-butyl-2[1H]-pyridone When ethylaminomethylchloride is reacted with the following nitropyridones in accordance with the above procedure:
  5-nitro-4-t-butyl-2[1H]-pyridone
  3-nitro-5-n-propyl-2[1H]-pyridone
  6-nitro-4-methyl-2[1H]-pyridone
  4-nitro-5-ethyl-2[1H]-pyridone
  3-nitro-4,5,6-trimethyl-2[1H]-pyridone
  3-nitro-4,6-dimethyl-2[1H]-pyridone
  3-nitro-5-trifluoromethyl-2[1H]-pyridone
  5-nitro-3-methylthio-2[1H]-pyridone
  5-methylthio-4-ethyl-3-nitro-2[1H]-pyridone
  4-t-butyl-5-cyano-3-nitro-2[1H]-pyridone
  5-bromo-4-ethyl-3-nitro-2[1H]-pyridone
  5-chloro-3-nitro-6-methyl-2[1H]-pyridone 3-acetyl-5-nitro-6-methyl-2[1H]-pyridone
5-methoxy-1,6-dimethyl-3-nitro-2[1H]-pyridone
4-carboxymethyl-3-nitro-2[1H]-pyridone
6-benzylthio-3-nitro-2[1H]-pyridone,
the following alkylaminoalkylpyridones are obtained:
  5-amino-1-ethylaminomethyl-4-t-butyl-2[1H]-pyridone
  3-amino-1-ethylaminomethyl-5-n-propyl-2[1H]-pyridone
  6-amino-1-ethylaminomethyl-4-methyl-2[1H]-pyridone
  4-amino-4-ethylaminomethyl-5-ethyl-2[1H]-pyridone
  3-amino-1-ethylaminomethyl-4,5,6-trimethyl-2[1H]-pyridone
  3-amino-1-ethylaminomethyl-4,6-dimethyl-2[1H]-pyridone
  3-amino-1-ethylaminomethyl-5-trifluoromethyl-2[1H]-pyridone
  5-amino-1-ethylaminomethyl-3-methylthio-2[1H]-pyridone
  5-methylthio-4-ethyl-3-amino-1-ethylaminomethyl-2[1H]-pyridone
  4-t-butyl-5-cyano-1-ethylaminomethyl-3-amino-2[1H]-pyridone
  5-bromo-4-ethyl-1-ethylaminomethyl-3-amino-2[1H]-pyridone
  5-chloro-3-amino-1-ethylaminomethyl-6-methyl-2[1H]-pyridone
  3-acetyl-5-amino-1-ethylaminomethyl-6-methyl-2[1H]-pyridone
  5-methoxy-1,6-dimethyl-1-ethylaminomethyl-3-amino-2[1H]-pyridone
  4-carboxymethyl-1-ethylaminomethyl-3-amino-2[1H]-pyridone
  6-benzylthio-1-ethylaminomethyl-3-amino-2[1H]-pyridone

EXAMPLE 31

Preparation of 4-t-butyl-1-[2-(acetamido)ethyl]-3-amino-2[1H]-pyridone

To an ice-cooled, stirred mixture of 4-t-butyl-3-nitro-2[1H]-pyridone (0.02 m.) in dimethylformamide (80 ml.) (nitrogen atmosphere) is added sodium hydride dispersion (0.02 m.) and the mixture stirred cold until hydrogen evolution has ceased and salt formation is complete. 2-(Acetamido)ethyl chloride (0.022 m.) is then added to the stirred salt mixture in portions so as to keep the temperature less than 10°C. The mixture is then allowed to warm to room temperature overnight, added to ice-water (200 ml.) containing acetic acid (1ml.), filtered and the filtrate extracted with chloroform. The chloroform extracts are washed with water, dried and concentrated to a residue. Chromatography (silica gel) of the combined residue and original filter cake yields pure 4-t-butyl-1-[2-(acetamido)-ethyl]-3-nitro-2[1H]-pyridone. Reduction according to Example 10 yields the corresponding amine; 3-amino-4-t-butyl-1-[2-(acetamido)ethyl]-2[1H]-pyridone.

Following the above procedure other representative alkylamidoalkyl pyridones of the invention may be prepared. For example, when the following nitropyridones are reacted with propionamidomethylchloride in accordance with the above procedure:
  3-nitro-4-methyl-2[1H]-pyridone
  5-nitro-4-methyl-2[1H]-pyridone
  3-nitro-5-methyl-2[1H]-pyridone
  3-nitro-5-chloro-2[1H]-pyridone
  3-nitro-4-t-butyl-2[1H]-pyridone
  3-nitro-4-methyl-6-t-butyl-2[1H]-pyridone
  3-nitro-5,6-dimethyl-2[1H]-pyridone
  3-nitro-4,5-dimethyl-2[1H]-pyridone
  5-nitro-4-ethyl-2[1H]-pyridone
  3-nitro-6-ethyl-5-methyl-2[1H]-pyridone
  3-nitro-6-sec-butyl-2[1H]-pyridone
  5-nitro-6-ethyl-2[1H]-pyridone
  5-nitro-6-methyl-2[1H]-pyridone
  3-nitro-5-t-butyl-2[1H]-pyridone,
the following 1-alkylamidoalkyl pyridones are obtained:
  3-amino-1-propionamidomethyl-4-methyl-2[1H]-pyridone
  5-amino-1-propionamidomethyl-4-methyl-2[1H]-pyridone
  3-amino-1-propionamidomethyl-5-methyl-2[1H]-pyridone
  3-amino-1-propionamidomethyl-5-chloro-2[1H]-pyridone
  3-amino-1-propionamidomethyl-4-t-butyl-2[1H]-pyridone
  3-amino-1-propionamidomethyl-4-methyl-6-t-butyl-2[1H]-pyridone
  3-amino-1-propionamidomethyl-5,6-dimethyl-2[1H]-pyridone
  3-amino-1-propionamidomethyl-4,5-dimethyl-2[1H]-pyridone
  5-amino-1-propionamidomethyl-4-ethyl-2[1H]-pyridone
  3-amino-1-propionamidomethyl-6-ethyl-5-methyl-2[1H]-pyridone
  3-amino-1-propionamidomethyl-6-sec-butyl-2[1H]-pyridone
  5-amino-1-propionamidomethyl-6-ethyl-2[1H]-pyridone
  5-amino-1-propionamidomethyl-6-methyl-2[1H]-pyridone
  3-amino-1-propionamidomethyl-5-t-butyl-2[1H]-pyridone

EXAMPLE 32

A mixture of 250 parts of 3-amino-4-methyl-2[1H]-pyridone and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

The 3-amino-4-methyl-2[1H]-pyridone used in the foregoing example may be replaced by 25, 100 or 500 parts of other pyridones of this invention to produce tablets suitable for oral administration as an anti-inflammatory, antipyretic and/or analgesic according to the method of this invention.

EXAMPLE 33

A mixture of 50 parts of 5-amino-4-methyl-2[1H]-pyridone, 3 parts of the calcium salt of lignin sulphonic acid, and 237 parts of water is ball-milled until the size of substantially all of the particles of 5-amino-4-methyl-2[1H]-pyridone is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 34

A mixture of 250 parts of 3-amino-5-methyl-2[1H]-pyridone, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 35

A mixture of 500 parts 3-amino-4,5-dimethyl-2[1H]-pyridone, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 36

1. Tablets.--10,000 scored tablets for oral use, each containing 500 mg. of pyridone, are prepared from the following ingredients:

|  | Gm. |
|---|---|
| 3-amino-4-methyl-2[1H]pyridone | 5000 |
| Starch, U.S.P. | 350 |
| Talc, U.S.P. | 250 |
| Calcium stearate | 35 |

The powdered pyridone is granulated with a 4% w./v. aqueous solution of methylcellulose U.S.P. (1500 cps.). To the dried granules is added a mixture of the remainder of the ingredients and the final mixture compressed into tablets of proper weight.

2. Capsules.--10,000 two-piece hard gelatin capsules for oral use, each containing 250 mg. of pyridone are prepared from the following ingredients:

|  | Gm. |
|---|---|
| 3-amino-4-methyl-2[1H]pyridone | 2500 |
| Lactose, U.S.P. | 1000 |
| Starch, U.S.P. | 300 |
| Talc, U.S.P. | 65 |
| Calcium stearate | 25 |

The powdered pyridone is mixed with the starch-lactose mixture followed by the talc and calcium stearate. The final mixture is then encapsulated in the usual manner. Capsules containing 10, 25, 50, and 100 mg. of pyridone are also prepared by substituting 100, 250, 500 and 1000 gm. for 2500 gm. in the above formulation.

3. Soft elastic capsules.--One-piece soft elastic capsules for oral use, each containing 200 mg. of 3-amino-4-methyl-2[1H]pyridone, are prepared in the usual manner by first dispersing the powdered active material in sufficient corn oil to render the material capsulatable.

4. Aqueous suspension. An aqueous suspension for oral use containing in each 5 ml., 1 gram of pyridone is prepared from the following ingredients:

| 3-amino-4-methyl-2[1H]pyridone | gm | 2000 |
|---|---|---|
| Methylparaben, U.S.P. | gm | 7.5 |
| Propylparaben U.S.P | gm | 2.5 |
| Saccharin sodium | gm | 12.5 |
| Cyclamate sodium | gm | 2.5 |
| Glycerin | ml | 3000 |
| Tragacanth powder | gm | 10 |
| Orange oil flavor | gm | 10 |
| F. D. and C. orange dye | gm | 7.5 |
| Deionized water, q.s. to 10,000 mg. | | |

What is claimed is:

1. A compound of the formula:

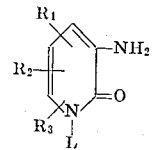

in which L is loweralkylaminolower alkyl or diloweralkylaminolower alkyl; $R_1$, $R_2$ and $R_3$ are each hydrogen, loweralkyl, haloloweralkyl or cycloloweralkyl of from 3–6 carbon atoms with the proviso that at least two of said $R_1$–$R_3$ are other than hydrogen.

2. 3-Amino-1-methylethylaminoethyl-4-methyl-6-t-butyl-2[1H]-pyridone according to claim 1.

* * * * *